(12) United States Patent
Uemura

(10) Patent No.: US 9,164,255 B2
(45) Date of Patent: Oct. 20, 2015

(54) LENS BARREL AND IMAGING APPARATUS

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/340,898

(22) Filed: Jul. 25, 2014

(65) Prior Publication Data

US 2015/0043088 A1 Feb. 12, 2015

(30) Foreign Application Priority Data

Aug. 6, 2013 (JP) .................................. 2013-163025

(51) Int. Cl.

| G02B 15/14 | (2006.01) |
|---|---|
| G02B 7/04 | (2006.01) |
| G02B 7/10 | (2006.01) |
| G02B 7/02 | (2006.01) |

(52) U.S. Cl.
CPC .. *G02B 7/04* (2013.01); *G02B 7/10* (2013.01); *G02B 15/14* (2013.01); *G02B 7/021* (2013.01); *G02B 7/022* (2013.01); *G02B 7/023* (2013.01)

(58) Field of Classification Search
CPC .......... G02B 7/02; G02B 7/021; G02B 7/022; G02B 7/023; G02B 7/026; G02B 7/04; G02B 7/08; G02B 7/10; G02B 7/102; G02B 15/14; G02B 15/15; G02B 17/00; G02B 17/04

USPC ............. 359/694–704; 396/79, 348, 349, 378
See application file for complete search history.

(56) References Cited

U.S. PATENT DOCUMENTS

| 5,699,200 | A | * | 12/1997 | Uno et al. ...................... 359/700 |
| 6,097,548 | A | * | 8/2000 | Funahashi et al. ............. 359/694 |
| 7,885,525 | B2 | * | 2/2011 | Terada ............................ 396/79 |
| 8,411,372 | B2 | | 4/2013 | Kudoh | |
| 8,442,395 | B2 | * | 5/2013 | Terada ............................ 396/79 |
| 2011/0242679 | A1 | | 10/2011 | Kudoh | |

FOREIGN PATENT DOCUMENTS

| JP | 2007-093999 A | 4/2007 |
| JP | 2011-215279 A | 10/2011 |

\* cited by examiner

*Primary Examiner* — Loha Ben
(74) *Attorney, Agent, or Firm* — Fitzpatrick, Cella, Harper & Scinto

(57) ABSTRACT

A lens barrel includes a cam cylinder that is provided with a cam groove on the inner circumference thereof and a linear cylinder that restricts movement of the lens holding unit. A plurality of bayonet protrusions are provided on the linear cylinder at different positions in the optical axis direction. A plurality of bayonet grooves that engage with the bayonet protrusions provided on the linear cylinder so as to achieve the relative position restriction between the cam cylinder and the linear cylinder in the optical axis direction are further provided on the inner circumference of the cam cylinder. In accordance with the relative rotation of the cam cylinder with respect to the linear cylinder, the relative position restriction between the cam cylinder and the linear cylinder due to the engagement of the bayonet protrusions with the bayonet grooves is changed to position restriction depending on the relative rotation.

5 Claims, 13 Drawing Sheets

LENS BARREL AND IMAGING APPARATUS

BACKGROUND OF THE INVENTION

1. Field of the Invention

The present invention relates to a lens barrel and an imaging apparatus.

2. Description of the Related Art

There has been proposed a lens barrel including a zoom mechanism that moves a plurality of lenses to a predetermined position by causing a linear cylinder to restrict the movement of a plurality of lens holding frames in the rotational direction while moving the plurality of lens holding frames for respectively holding the plurality of lenses in the optical axis direction by the rotation of a cam cylinder.

In order to meet the recent requirement for increasing an image-taking magnification, the number of lenses increases and a total extended length increases, resulting in a tendency with an increase in size of a lens barrel. On the other hand, there is also a requirement for thinning of a camera, and thus, the thickness of the camera when the lens barrel is retracted into the camera body needs to be reduced as much as possible.

In order to achieve thinning of a camera, it is contemplated that barrels in which the dimension is reduced in the optical axis direction are connected in a multi-stage configuration. However, there are many restrictions for disposing a plurality of cam grooves on a barrel without mutual intersection in terms of space.

On the other hand, bayonet grooves which are followed by bayonet protrusions provided on a linear cylinder are typically formed on the inner circumference of a cam cylinder. Then, the bayonet protrusion is mated with the bayonet groove so as to contact against both side wall surfaces of the bayonet groove in the width direction, so that the relative position restriction between the cam cylinder and the linear cylinder in the optical axis direction is achieved.

However, a plurality of cam grooves which are followed by the followers respectively provided on a plurality of lens holding frames is disposed on the inner circumference of the cam cylinder, a restriction may also occur in the space in which the bayonet groove is disposed.

Japanese Patent Laid-Open No. 2007-093999 discloses a lens barrel in which bayonet grooves are disposed along the circumferential direction of the cam cylinder so as to intersect a plurality of cam grooves formed on the inner circumference of the cam cylinder. Japanese Patent Laid-Open No. 2011-215279 discloses a lens barrel that restricts the relative position between the cam cylinder and the linear cylinder in the optical axis direction by sandwiching a portion between the image plane side wall surface of the bayonet groove and the image plane side end surface of the cam cylinder in the optical axis direction by the bayonet protrusion and the linear rib both provided on the linear cylinder at the TELE position.

In the lens barrel disclosed in Japanese Patent Laid-Open No. 2007-093999, the bayonet grooves must be disposed so as to intersect all of the cam grooves such that the bayonet protrusion steps over the cam groove when the bayonet protrusion passes through the cam groove. If the bayonet grooves are not disposed as described above, the bayonet protrusion is outside the bayonet groove when the bayonet protrusion passes through the cam groove, so that the relative position restriction cannot be made between the cam cylinder and the linear cylinder in the optical axis direction. Thus, the degree of freedom in selection of parts in which the cam grooves and the bayonet grooves are disposed on the inner circumference of the cam cylinder decreases, so that the lens barrel fails to correspond to various operations of lens groups.

In addition, in the lens barrel disclosed in Japanese Patent Laid-Open No. 2011-215279, the cam cylinder needs to rotate while avoiding the linear rib when the cam cylinder rotates relatively with respect to the linear cylinder, so that a restriction occurs in the arrangement of bayonet grooves.

SUMMARY OF THE INVENTION

The present invention provides a lens barrel that is capable of increasing the degree of freedom in selection of parts in which cam grooves and bayonet grooves are disposed on the inner circumference of a cam cylinder.

According to an aspect of the present invention, a lens barrel is provided that includes a lens holding unit configured to hold a lens; and a cam cylinder that is provided with a cam groove for engaging with the lens holding unit on an inner circumference thereof and of which movement in the optical axis direction while being rotated causes the lens holding unit to move in the optical axis direction; and a linear cylinder that is disposed on the inner circumference side of the cam cylinder and restricts movement of the lens holding unit in the rotational direction while moving in the optical axis direction engaging with the cam cylinder, wherein a plurality of bayonet protrusions are provided on the linear cylinder at different positions in the optical axis direction, a plurality of bayonet grooves that engage with the bayonet protrusions provided on the linear cylinder so as to achieve a relative position restriction between the cam cylinder and the linear cylinder in the optical axis direction are further provided on the inner circumference of the cam cylinder at different positions in the optical axis direction, and the relative position restriction between the cam cylinder and the linear cylinder in the optical axis direction due to the engagement of the bayonet protrusions with the bayonet grooves is changed in accordance with a relative rotation of the cam cylinder with respect to the linear cylinder.

According to the present invention, a lens barrel that is capable of increasing the degree of freedom in selection of parts in which cam grooves and bayonet grooves are disposed on the inner circumference of a cam cylinder may be provided, so that the lens barrel can correspond to the various operations of lens groups.

Further features of the present invention will become apparent from the following description of exemplary embodiments with reference to the attached drawings.

DESCRIPTION OF THE EMBODIMENTS

Figure 1:
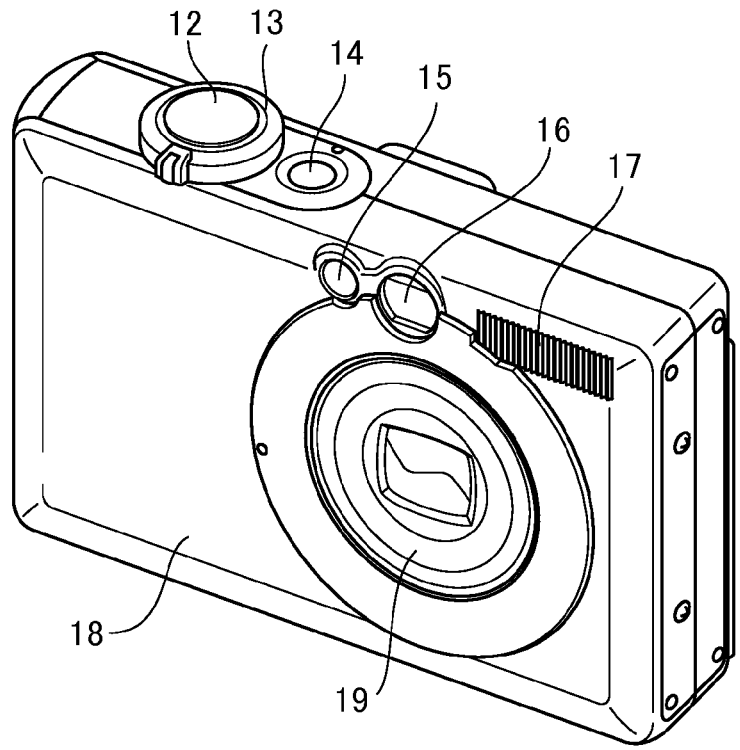
FIG. 1 is a perspective view illustrating an exemplary external appearance of an imaging apparatus as viewed from the front side.
Figure 2:
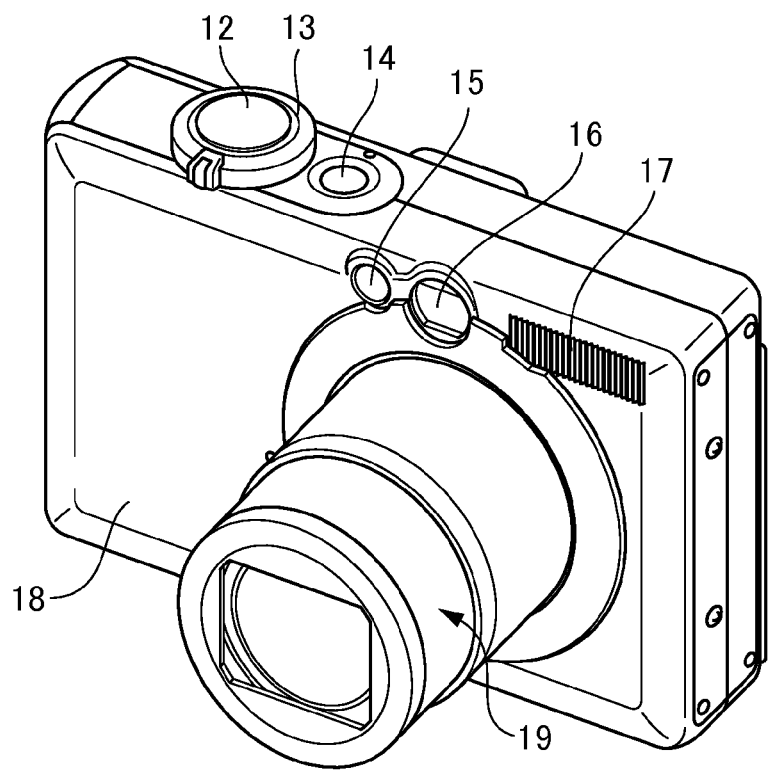
FIG. 2 is a perspective view illustrating an exemplary external appearance of a digital camera in the power-on state.
Figure 3:
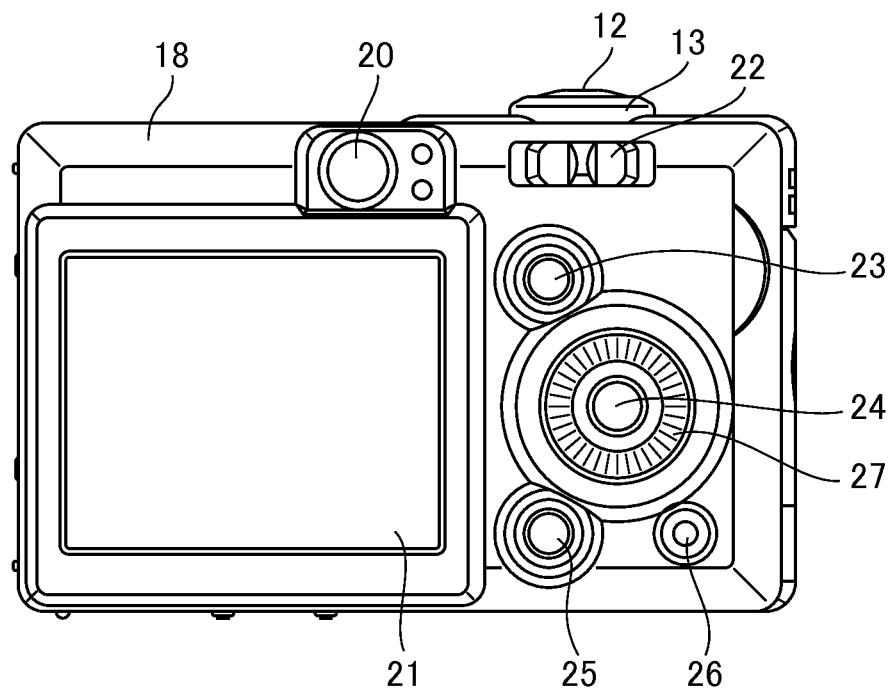
FIG. 3 is a rear view illustrating an exemplary digital camera.
Figure 4:
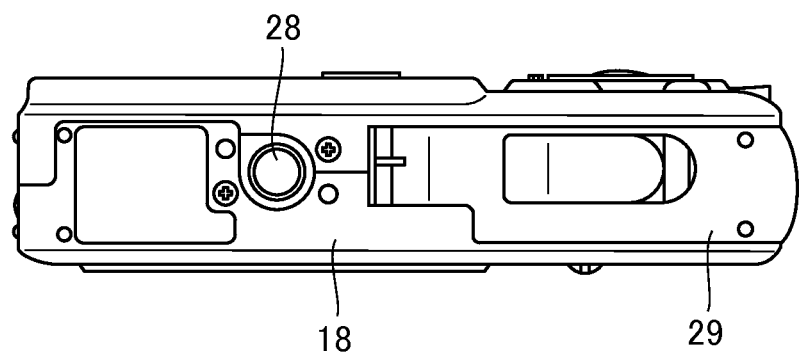
FIG. 4 is a bottom view illustrating an exemplary digital camera.

Hereinafter, preferred embodiments of the present invention will be described with reference to the drawings. FIG. 1 is a perspective view illustrating an exemplary external appearance of an imaging apparatus including the lens barrel of the present embodiment as viewed from the front side. The imaging apparatus shown in FIG. 1 is a digital camera 18. FIG. 2 is a perspective view illustrating an exemplary external appearance of the digital camera shown in FIG. 1 in the power-on state. FIG. 3 is a rear view illustrating the digital camera shown in FIG. 1. FIG. 4 is a bottom view illustrating the digital camera shown in FIG. 1.

The digital camera 18 includes a zoom mechanism that moves between the image-taking position and the retracted position in the optical axis direction so as to change an image-taking magnification. As shown in FIG. 1, a finder 16 for determining the composition of an object, an auxiliary light source 15 for performing light measurement and distance measurement, a strobe 17, and a lens barrel 19 are disposed on the front surface of the digital camera 18. A release button 12, a power changeover button 14, and a zoom changeover switch 13 are disposed on the top surface of the digital camera 18.

As shown in FIG. 3, operation buttons 22 to 27, a display 21 such as an LCD (Liquid Crystal Display), and a finder eyepiece 20 are disposed on the rear surface of the digital camera 18.

Furthermore, as shown in FIG. 4, a tripod mounting portion 28 and a cover 29 are disposed on the bottom surface of the digital camera 18. The cover 29 covers a memory card drive 42 (see FIG. 5) and a battery inserting portion (not shown).

Figure 5:
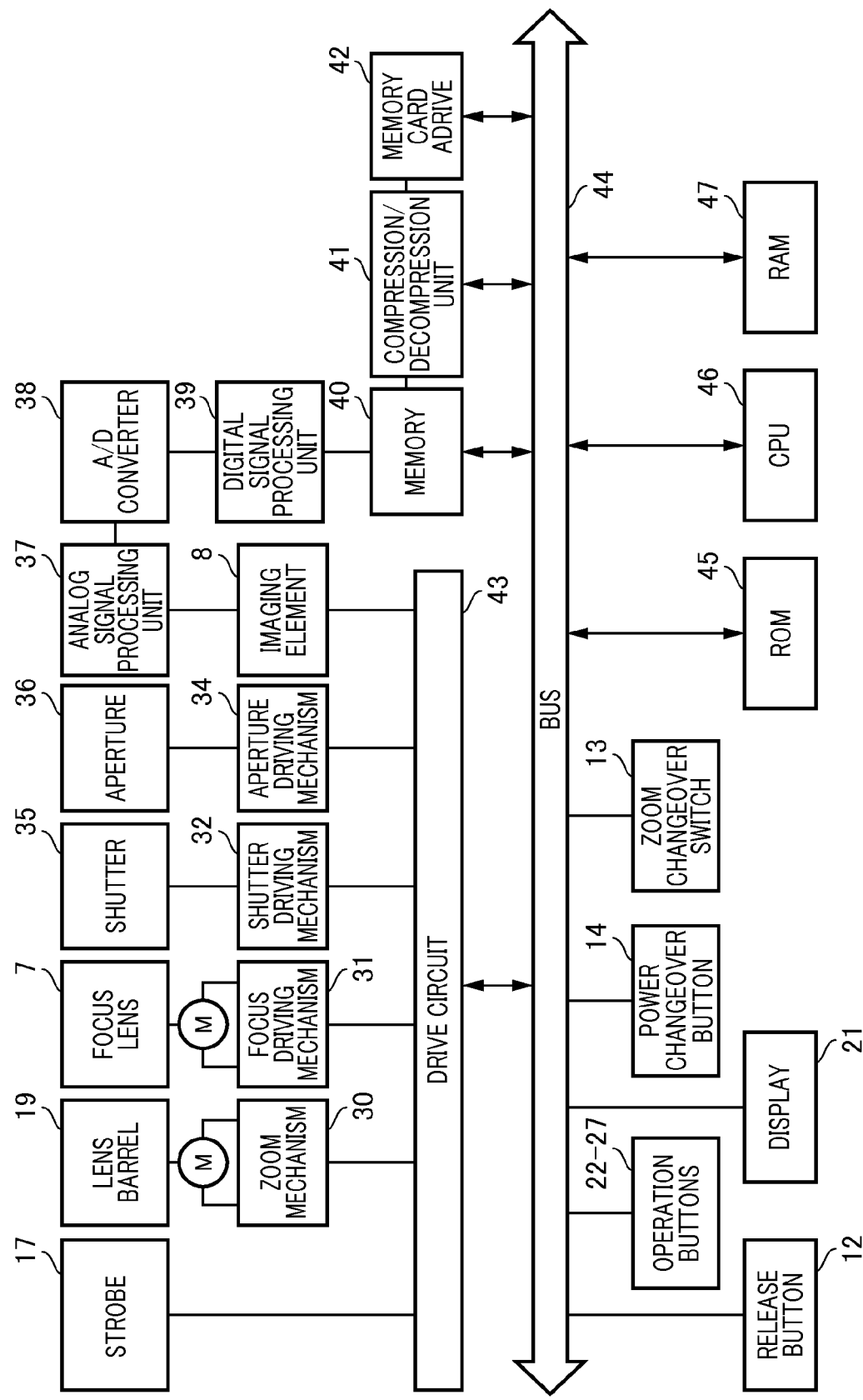
FIG. 5 is a functional block diagram illustrating an exemplary digital camera.

FIG. 5 is a functional block diagram illustrating the digital camera 18 shown in FIG. 1. A CPU 46, a ROM 45, a RAM 47, the release button 12, the operation buttons 22 to 27, the display 21, the power changeover button 14, the zoom switch 13, a memory 40, a compression/decompression unit 41, a memory card drive 42, and a drive circuit 43 are connected to a bus 44, where CPU is an abbreviation for Central Processing Unit, ROM is an abbreviation for Read Only Memory, and RAM is an abbreviation for Random Access Memory.

The drive circuit 43 is connected to a zoom mechanism 30 for zoom driving of the lens barrel 19, a focus driving mechanism 31 for driving a focus lens 7, a shutter driving mechanism 32 for driving a shutter 35, and an aperture driving mechanism 34 for driving an aperture 36. The drive circuit 43 is also connected to an imaging element 8 such as a CCD sensor, a CMOS sensor, or the like and the strobe 17, where CCD is an abbreviation for Charge Coupled Device and CMOS is an abbreviation for Complementary Metal-Oxide Semiconductor. The driving of the units connected to the drive circuit 43 is controlled via the drive circuit 43 based on the signal from the CPU 46.

The ROM 45 stores various control programs and the like, and the RAM 47 stores data required for various control programs. An analog signal processing unit 37 performs analog processing for image data output from the imaging element 8, and then outputs the resulting data to an A/D converter 38.

The A/D converter 38 converts analog data captured from the imaging element 8 into digital data, and then outputs the digital data to a digital signal processing unit 39. The digital signal processing unit 39 performs predetermined processing for digital data converted by the A/D converter 38, and then outputs the resulting data as image data to the memory 40.

Image data stored in the memory 40 is subject to compression processing such as JPEG or TIFF by the compression/decompression unit 41 through the operation of the operation button 23, and then is output to and stored in a memory card mounted on the memory card drive 42.

Image data stored in the memory 40 or image data stored in the memory card is subject to decompression processing by the compression/decompression unit 41, and then can be displayed on the display 21 via the bus 44. For example, when a user sees an image displayed on the display 21 and determines the image as unnecessary, the image can be deleted by the operation of the operation button 24.

Figure 6:
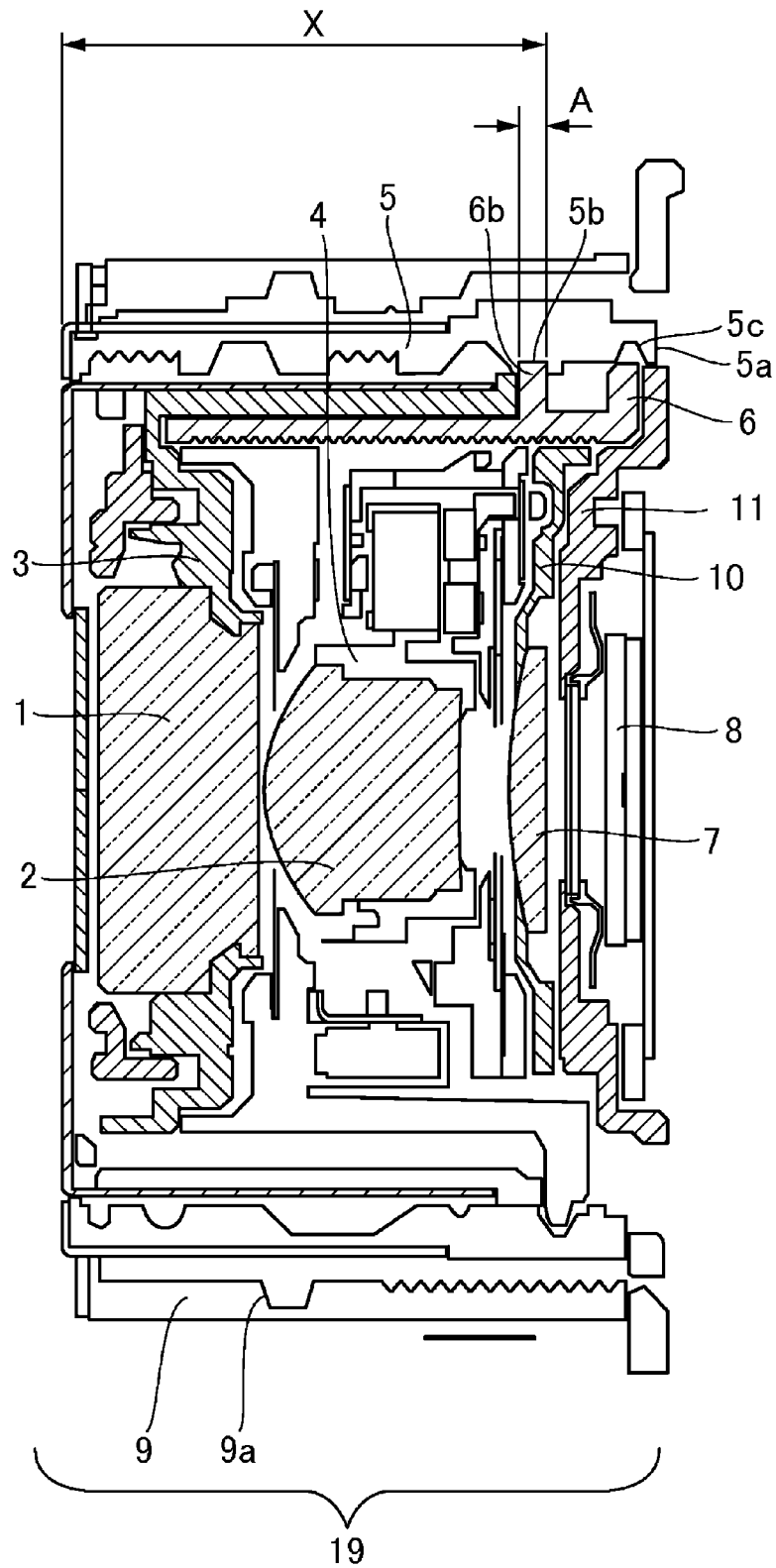
FIG. 6 is a cross-sectional view illustrating the state of a lens barrel being in the retracted position.
Figure 7:
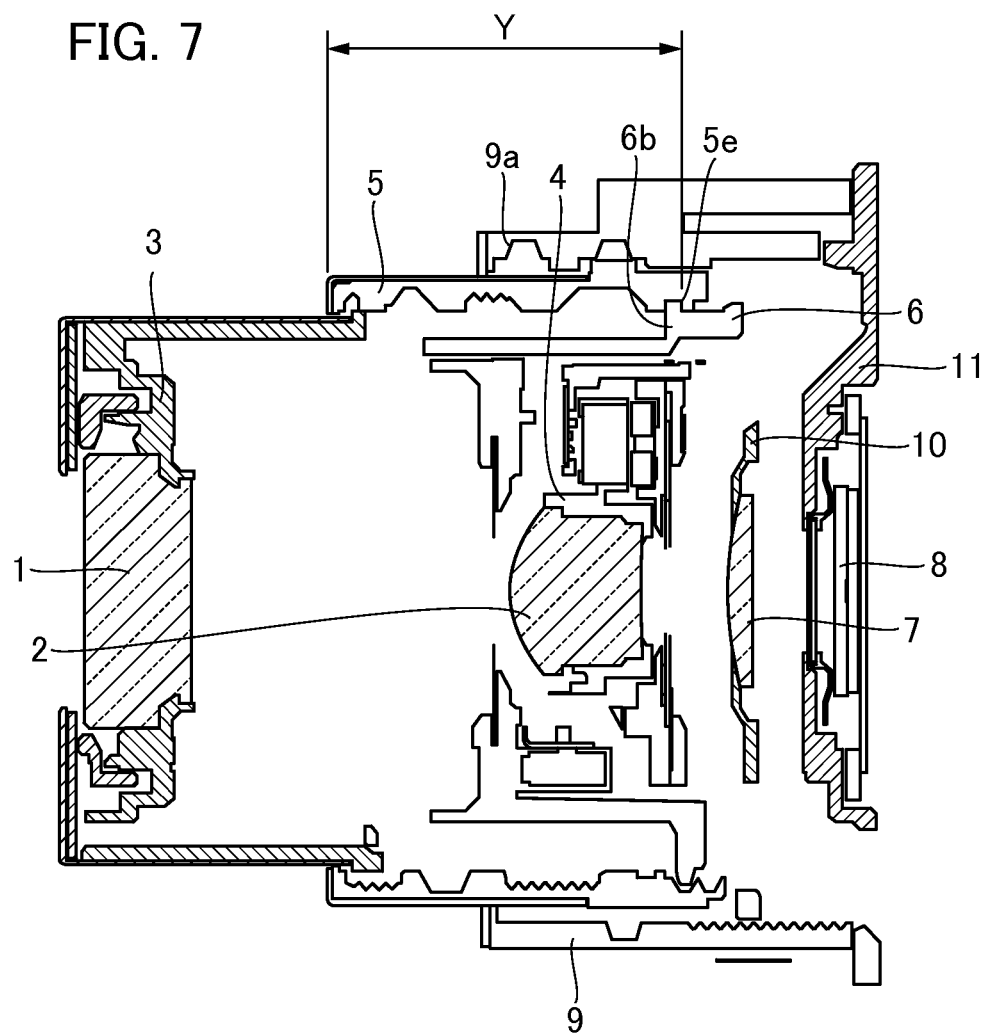
FIG. 7 is a cross-sectional view illustrating the state of a lens barrel being in the image-taking position.
Figure 8:
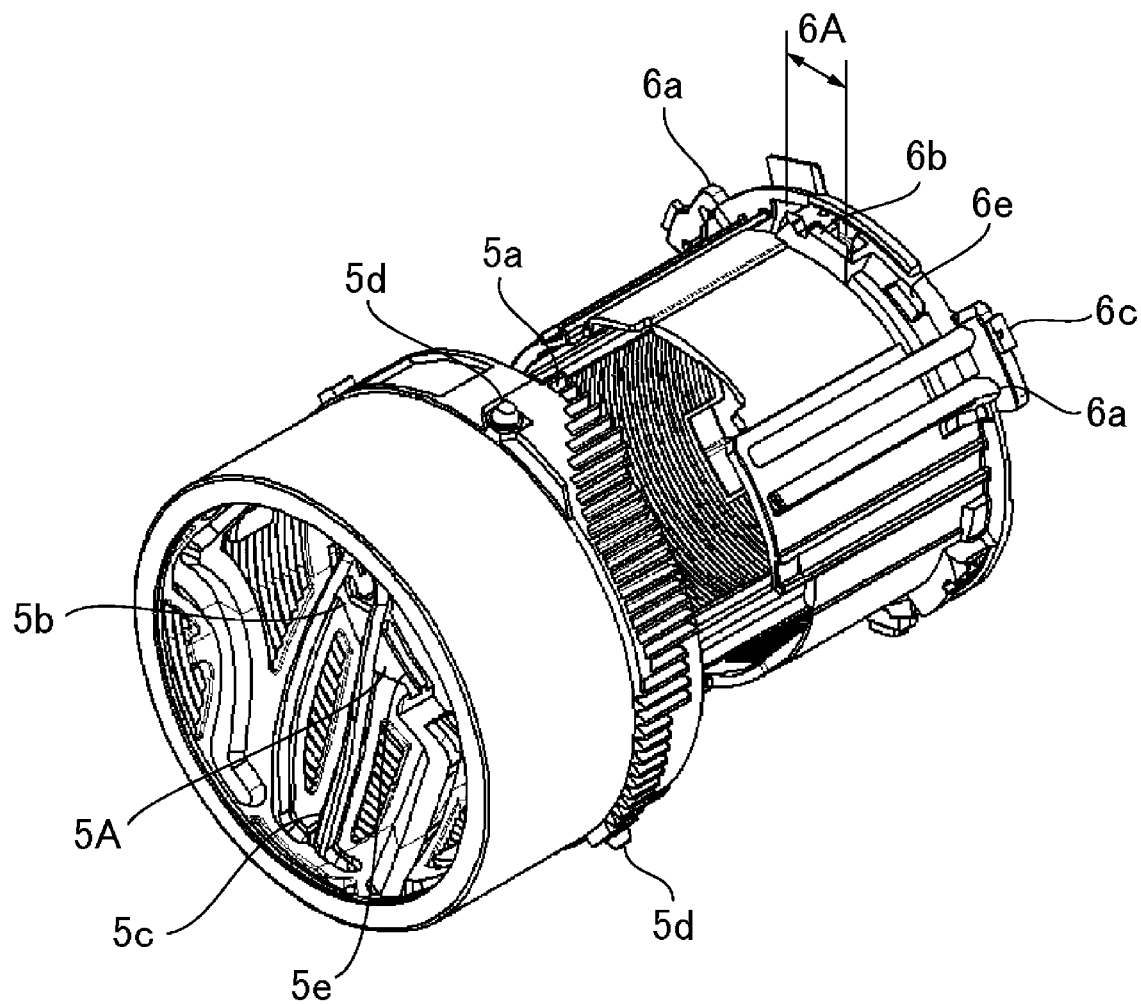
FIG. 8 is an exploded perspective view illustrating a cam cylinder and a linear cylinder.

Next, a description will be given of the lens barrel 19 with reference to FIGS. 6 to 12. FIG. 6 is a cross-sectional view illustrating the state of the lens barrel 19 being in the retracted position. FIG. 7 is a cross-sectional view illustrating the state of the lens barrel 19 being in the image-taking position. FIG. 8 is an exploded perspective view illustrating a cam cylinder and a linear cylinder.

As shown in FIG. 6 and FIG. 7, in the lens barrel 19, a first lens 1 is held by a first lens holding frame 3 and a second lens 2 which is disposed on the image plane side (the imaging element 8 side) of the first lens 1 is held by a second lens holding frame 4.

Each of the first lens holding frame 3 and the second lens holding frame 4 has a follower (not shown) that follows a cam groove 5c (see FIG. 12), which is a cam groove provided on the inner circumference of the cam cylinder 5, with the follower engaging the cam groove 5c. In this example, a follower pin is used as the follower. The follower follows the cam groove 5c, so that the first lens holding frame 3 and the second lens holding frame 4 move in the optical axis direction in accordance with rotational movement of the cam cylinder 5 in the optical axis direction.

The first lens holding frame 3 and the second lens holding frame 4 are held so as to be linearly movable in the optical axis direction in a state where the movement of the first lens holding frame 3 and the second lens holding frame 4 in the rotational direction is restricted by a linear cylinder 6 disposed on the inner circumference side of the cam cylinder 5. Specifically, the linear cylinder 6 is a linear restricting member that is operable to move in the optical axis direction with the linear cylinder 6 engaging the cam cylinder 5 and restricts movement of the first lens holding frame 3 and the second lens holding frame 4 in the rotational direction. The first lens holding frame 3 and the second lens holding frame 4 are exemplary lens holding units.

The cam cylinder 5 has a follower pin 5d (see FIG. 8) that follows a cam groove 9a provided on the inner circumference of a fixed cylinder 9. The power is transmitted from a zoom mechanism 30 so that the cam cylinder 5 moves in the optical axis direction while being rotated.

The linear cylinder 6 has a linear key 6c that engages with a linear groove (not shown) provided on the inner circumference of the fixed cylinder 9. The linear key 6c is guided by the linear groove so that the linear cylinder 6 linearly moves in the optical axis direction in a state where the rotation of the linear cylinder 6 is restricted.

A third lens holding frame 10 for holding a third lens 7 is disposed between the second lens holding frame 4 and the imaging element 8, and the imaging element 8 is held by an imaging element holding frame 11 secured to the fixed cylinder 9. In the present embodiment, the third lens 7 is a focus lens.

The cam cylinder 5 is rotated by the zoom mechanism 30, so that the cam cylinder 5 extends in the optical axis direction and the first lens holding frame 3 and the second lens holding frame 4 also extend in the optical axis direction. At this time, the linear cylinder 6 is bayonet-coupled with the cam cylinder 5, and is substantially integrated with the cam cylinder 5 so as to linearly move in the optical axis direction.

In the present embodiment, the cam cylinder 5 relatively moves toward and away from the linear cylinder 6 in the optical axis direction by the bayonet coupling structure (to be described below) of the cam cylinder 5 and the linear cylinder 6.

The cam cylinder 5 and the linear cylinder 6 are disposed relatively close to each other in the retracted position (FIG. 6) of the lens barrel 19, and the cam cylinder 5 and the linear cylinder 6 are disposed relatively away from each other in the image-taking position (FIG. 7) of the lens barrel 19.

Figure 9A:
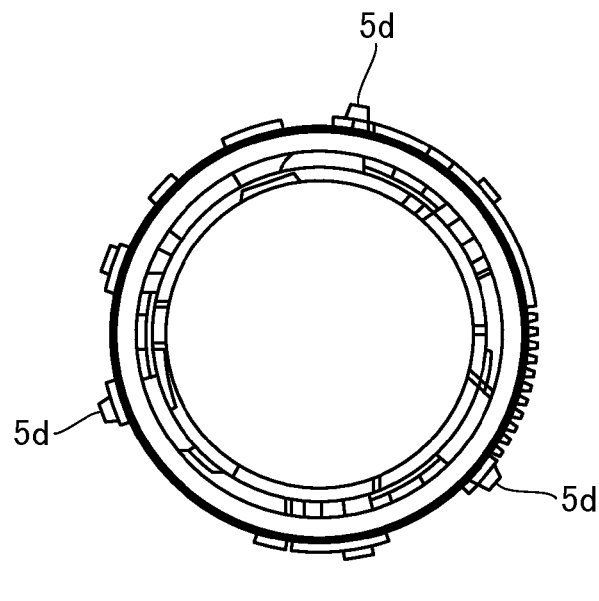
FIGS. 9A and 9B are diagrams illustrating a positional relationship between a cam cylinder and a linear cylinder in a state where a lens barrel is in the retracted position.
Figure 9B:
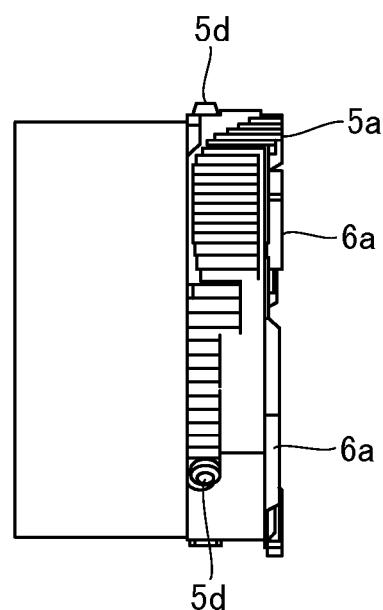

FIGS. 9A and 9B are diagrams illustrating a positional relationship between the cam cylinder 5 and the linear cylinder 6 in a state where the lens barrel 19 is in the retracted position. FIG. 9A illustrates the cam cylinder 5 and the linear cylinder 6 as viewed from the optical axis direction. FIG. 9B is a side view of the cam cylinder 5 and the linear cylinder 6 shown in FIG. 9A.

As shown in FIGS. 9A and 9B, the cam cylinder 5 and the linear cylinder 6 are disposed relatively close to each other in the optical axis direction in the retracted position of the lens barrel 19, and the projection 5a of the cam cylinder 5 and the linear rib 6a of the linear cylinder 6 are disposed so as to be circumferentially opposed to each other. With this arrangement, the length of the lens barrel 19 in the optical axis direction in the retracted position can be reduced, resulting in thinning of the camera.

Figure 10A:
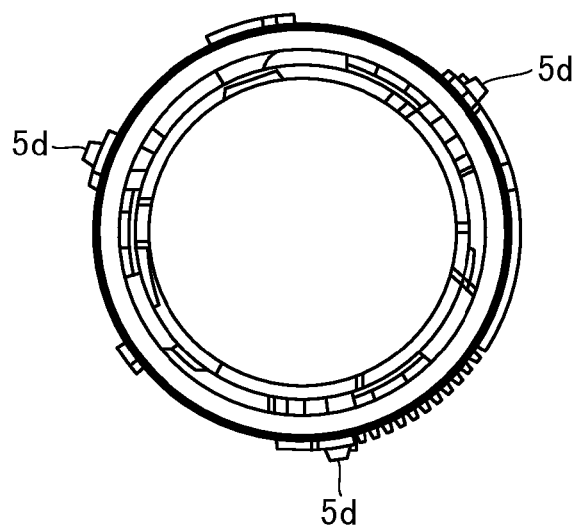
FIGS. 10A and 10B are diagrams illustrating a positional relationship between a cam cylinder and a linear cylinder in a state where a lens barrel is in the image-taking position.
Figure 10B:
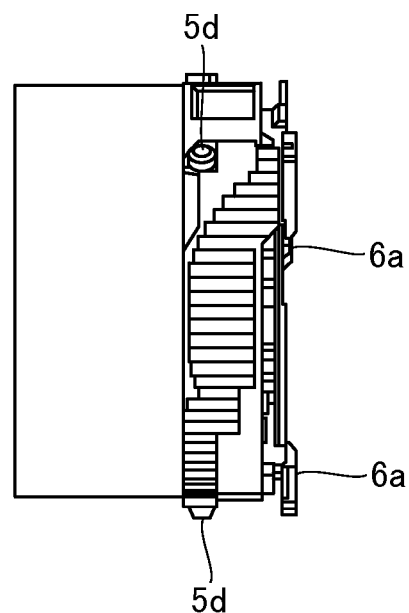

FIGS. 10A and 10B are diagrams illustrating a positional relationship between the cam cylinder 5 and the linear cylinder 6 in a state where the lens barrel 19 is in the image-taking position. FIG. 10A illustrates the cam cylinder 5 and the linear cylinder 6 as viewed from the optical axis direction. FIG. 10B is a side view of the cam cylinder 5 and the linear cylinder 6 shown in FIG. 10A.

The linear rib 6a of the linear cylinder 6 moves on the imaging element side of the projection 5a of the cam cylinder 5 in the image-taking position of the lens barrel 19. With this arrangement, the linear cylinder 6 relatively moves on the image plane side with respect to the cam cylinder 5 so that the cam cylinder 5 and the linear cylinder 6 are disposed relatively away from each other in the optical axis direction.

Referring back to FIG. 8, first bayonet protrusions 6b are provided on the linear cylinder 6 at plural locations (in the present embodiment, three locations) at substantially equi-intervals in the circumferential direction, i.e., around the optical axis. Helicoid portions 6A are disposed at both sides of the first bayonet protrusion 6b in the circumferential direction. At positions different from the first bayonet protrusions 6b in the optical axis direction, second bayonet protrusions 6e are also provided on the linear cylinder 6 at plural locations (in the present embodiment, three locations) at substantially equi-intervals in the circumferential direction.

FIGS. 11 to 14 are examples of a developed view illustrating the inner circumference side of the cam cylinder 5. As shown in FIGS. 11 to 14, a circumferential groove 5b which is followed by the first bayonet protrusion 6b upon rotation of the cam cylinder 5 and a circumferential groove 5e which is disposed at a different position from the circumferential groove 5b in the optical axis direction are formed to extend in the circumferential direction on the inner circumference of the end of the cam cylinder 5 on the image plane side. A circumferential groove 5f which has no side wall on the imaging element side is also disposed at a position different from the circumferential grooves 5b and 5e in the image-taking optical axis direction. At least any one of circumferential grooves 5b, 5e, and 5f engages with the first bayonet protrusion 6b or the second bayonet protrusion 6e.

A helicoid groove 5A which is followed by the first bayonet protrusion 6b upon rotation of the cam cylinder 5 is formed at a connecting portion between the circumferential grooves 5b and 5e. The helicoid groove 5A has a shape corresponding to the shape of the helicoid portion 6A of the first bayonet protrusion 6b, and diagonally extends in a direction away from the circumferential groove 5b toward the object side.

An inlet 5B for inserting the second bayonet protrusion 6e into the circumferential groove 5f is formed at a connecting portion between the circumferential grooves 5e and 5f. Furthermore, in the present embodiment, the circumferential grooves 5b, 5e, and 5f, the helicoid groove 5A, and the inlet 5B are disposed in three pairs at substantially equi-intervals in the circumferential direction of the inner circumference of the cam cylinder 5. The circumferential grooves 5b, 5e, and 5f, the helicoid groove 5A, and the inlet 5B correspond to exemplary bayonet grooves. The first bayonet protrusion 6b is disposed on the circumferential groove 5b and the second bayonet protrusion 6e is disposed on the circumferential groove 5e in the retracted position of the lens barrel 19 so that the cam cylinder 5 is bayonet-coupled with the linear cylinder 6.

Figure 11:
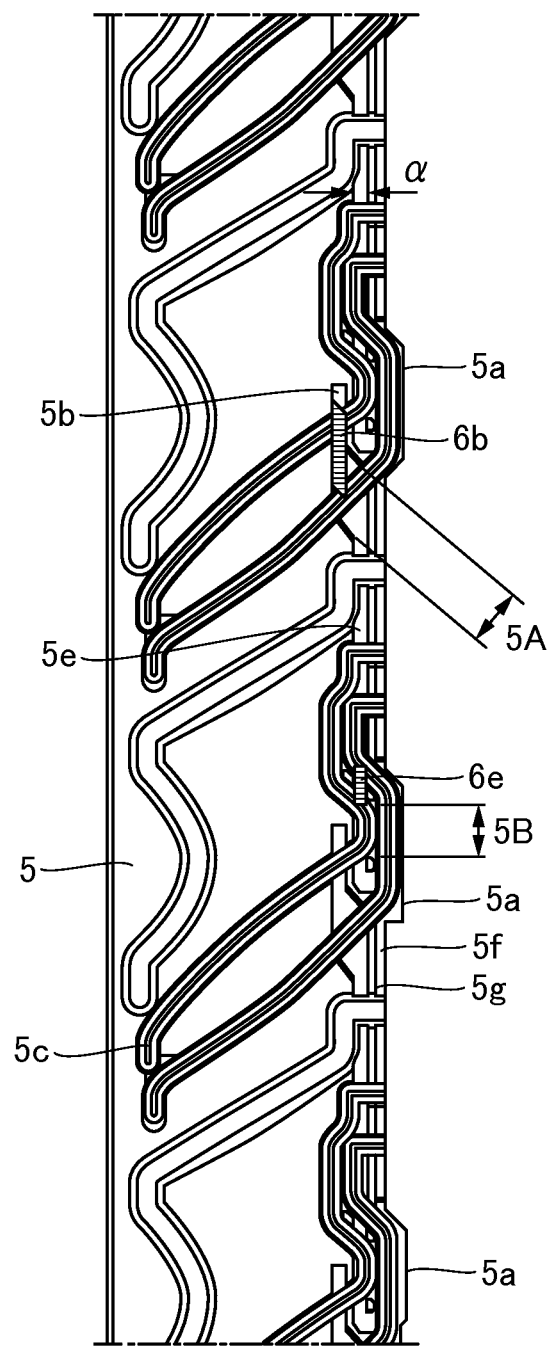
FIG. 11 is a developed view illustrating the inner circumference side of a cam cylinder in the retracted position.

FIG. 11 is a developed view illustrating the inner circumference side of a cam cylinder in the retracted position. As described in FIGS. 9A and 9B, in the retracted position of the lens barrel 19, the cam cylinder 5 and the linear cylinder 6 are disposed relatively close to each other in the optical axis direction, and the projection 5a of the cam cylinder 5 and the linear rib 6a of the linear cylinder 6 are disposed so as to be circumferentially opposed to each other.

Figure 12:
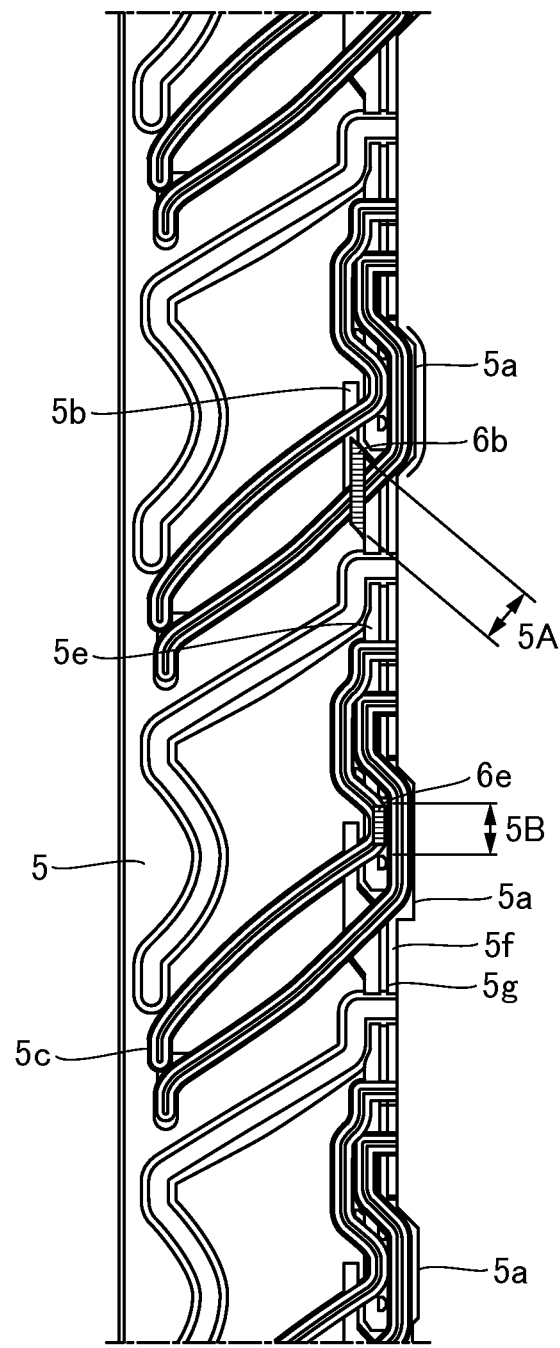
FIG. 12 is a developed view illustrating the inner circumference side of a cam cylinder in an intermediate position between the retracted position and the image-taking position.

FIG. 12 is a developed view illustrating the inner circumference side of a cam cylinder in an intermediate position between the retracted position and the image-taking position. As the cam cylinder 5 relatively rotates with respect to the linear cylinder 6, the first bayonet protrusion 6b follows along the helicoid groove 5A and then reaches the circumferential groove 5e. The second bayonet protrusion 6e extends from the circumferential groove 5e through an inlet groove 5B to thereby reach the circumferential groove 5f. At this time, the lens barrel 19 is located in the image-taking position, and the linear cylinder 6 moves toward the image plane side with respect to the cam cylinder 5 as described in FIGS. 10A and 10B so that the cam cylinder 5 and the linear cylinder 6 are disposed relatively away from each other in the optical axis direction.

Here, in the present embodiment, the cam groove 5*c* of the cam cylinder 5, which is followed by the follower pin of the second lens holding frame 4 in the image-taking position of the lens barrel 19, is provided with an extension toward the inner circumference (rear surface side) of the projection 5*a*. With this arrangement, the stroke between the first lens 1 and the second lens 2 in the optical axis direction can be increased by the subtraction of X shown in FIG. 6 from Y shown in FIG. 7. Consequently, the image-taking magnification of the camera can be increased. Note that the operation of the lens barrel 19 from the image-taking position to the retracted position is vice versa of the above operation.

Figure 16A:
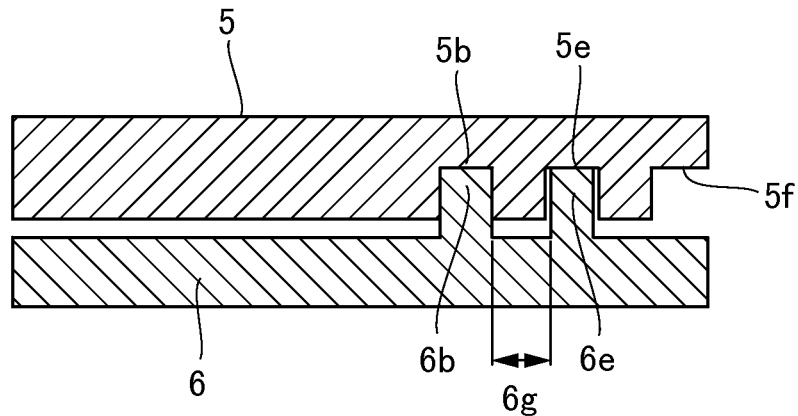
FIGS. 16A to 16C are diagrams illustrating the relative position restriction between a cam cylinder and a linear cylinder in the optical axis direction.
Figure 16B:
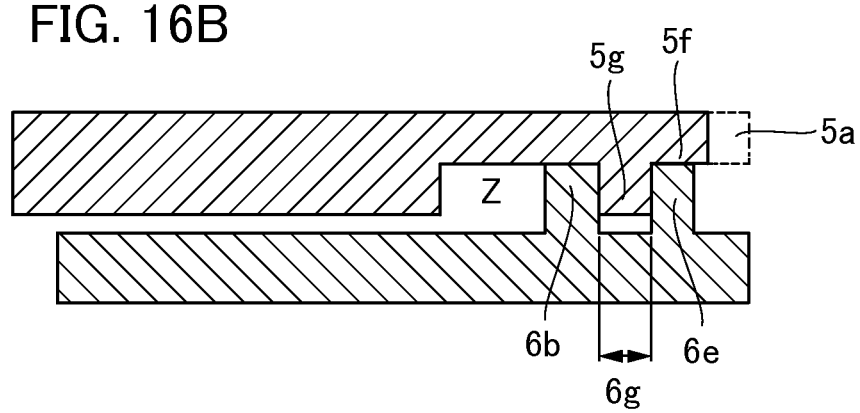
Figure 16C:
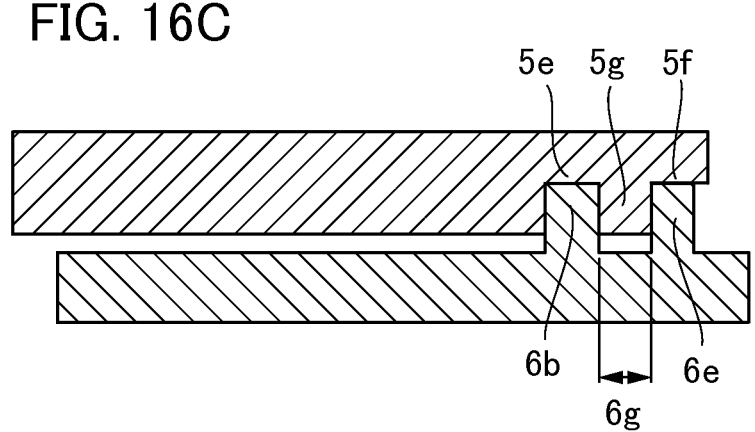

FIGS. 16A to 16C are diagrams illustrating the relative position restriction between a cam cylinder and a linear cylinder in the optical axis direction. With reference to FIG. 16, a description will be given of a change in relative position restriction between the cam cylinder and the linear cylinder in the optical axis direction due to the engagement of the bayonet protrusions with the bayonet grooves in accordance with the relative rotation of the cam cylinder with respect to the linear cylinder.

FIG. 16A is a diagram illustrating the relative position restriction between the cam cylinder and the linear cylinder in the optical axis direction in the retracted position of the lens barrel 19. In the retracted position of the lens barrel 19, the linear cylinder 6 is in the first relative position with respect to the cam cylinder 5 in the optical axis direction. In the retracted position of the lens barrel 19, the bayonet protrusion 6*b* of the linear cylinder 6 is mated with the circumferential groove 5*b* of the cam cylinder 5. Specifically, the bayonet protrusion 6*b* having a width A shown in FIG. 6 is mated with the circumferential groove 5*b* having a width α shown in FIG. 11 and the bayonet protrusion 6*b* contacts against the both side wall surfaces of the circumferential groove 5*b* in the width direction (the optical axis direction), so that the relative position restriction between the cam cylinder 5 and the linear cylinder 6 in the optical axis direction is achieved. The bayonet protrusion 6*e* of the linear cylinder 6 is mated with the circumferential groove 5*e* of the cam cylinder 5 but does not contact against both side wall surfaces of the circumferential groove 5*e* in the width direction (the optical axis direction).

Specifically, in the first relative position of the linear cylinder 6 with respect to the cam cylinder 5 in the optical axis direction, the first bayonet protrusion 6*b* contacts against both side wall surfaces of the first bayonet groove (the circumferential groove 5*b*) in the width direction, so that the relative position restriction between the cam cylinder 5 and the linear cylinder 6 in the optical axis direction is achieved.

Figure 13:
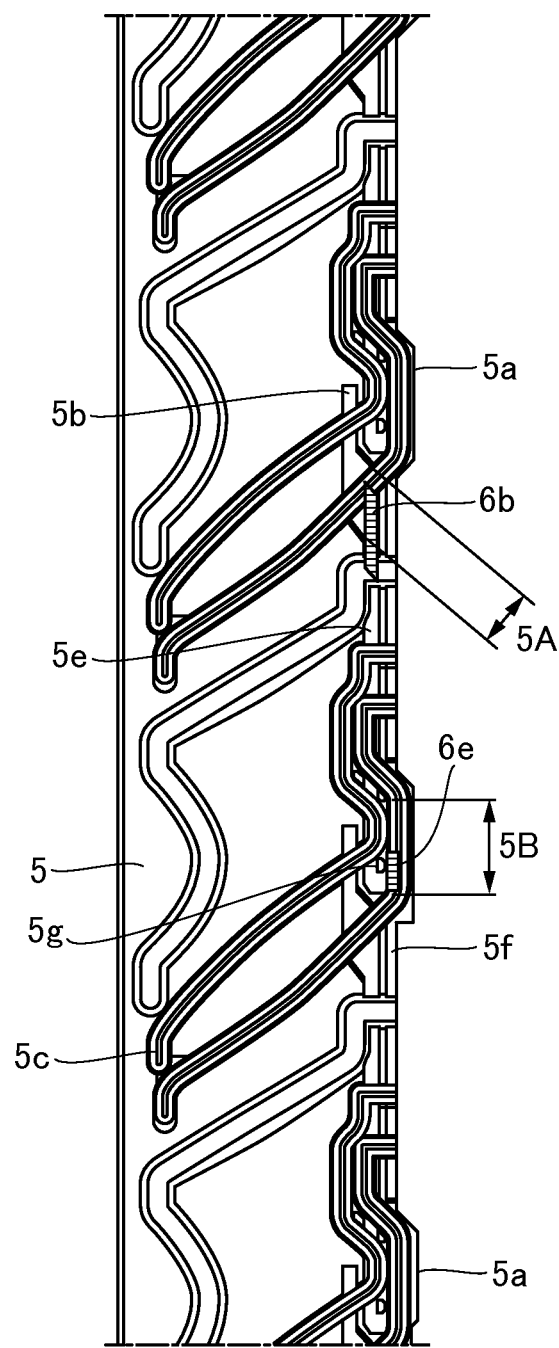
FIG. 13 is a developed view illustrating the inner circumference side of a cam cylinder in the first image-taking position.

Next, a description will be given of the relative position restriction between the cam cylinder and the linear cylinder in the optical axis direction in the first image-taking position (e.g., WIDE image-taking position) which is an initial image-taking position immediately after the cam cylinder 5 and the linear cylinder 6 are disposed relatively away from each other. In the first image-taking position of the lens barrel 19, the linear cylinder 6 is disposed close to the cam cylinder 5 and is in the second relative position with respect to the cam cylinder 5 in the optical axis direction. FIG. 13 is a developed view illustrating the inner circumference side of a cam cylinder in the first image-taking position. FIG. 16C is a diagram illustrating the first relative position restriction between the cam cylinder and the linear cylinder in the optical axis direction in the first image-taking position.

As the cam cylinder 5 shown in FIG. 16A relatively rotates with respect to the linear cylinder 6, the first bayonet protrusion 6*b* follows along the helicoid groove 5A and then reaches the circumferential groove 5*e*. The second bayonet protrusion 6*e* extends from the circumferential groove 5*e* through an inlet groove 5B to thereby reach the circumferential groove 5*f*. With this arrangement, the lens barrel 19 is in the first image-taking position. Specifically, the helicoid groove 5A functions as a first inlet groove through which the first bayonet protrusion 6*b* passes when the linear cylinder 6 moves from the first relative position to the second relative position. The inlet groove 5B functions as a second inlet groove through which the second bayonet protrusion 6*e* passes when the linear cylinder 6 moves from the first relative position to the second relative position.

The first bayonet protrusion 6*b* of the linear cylinder 6 is mated with the circumferential groove 5*e* of the cam cylinder 5 in the first image-taking position. A bayonet groove 6*g* which is formed by a region sandwiched between the first bayonet protrusion 6*b* and the second bayonet protrusion 6*e* of the linear cylinder 6 is mated with a circumferential rib portion 5*g* which is formed by the circumferential grooves 5*e* and 5*f* of the cam cylinder 5. Specifically, the bayonet protrusion 6*b* contacts against both side wall surfaces of the second bayonet groove (the circumferential groove 5*e*) in the width direction, and a recess (the bayonet groove 6*g*) is received by a protrusion (the circumferential rib portion 5*g*) formed by the second bayonet groove (the circumferential groove 5*e*) and the third bayonet groove (the circumferential groove 5*f*). With this arrangement, the second relative position restriction between the cam cylinder 5 and the linear cylinder 6 in the optical axis direction is achieved in the first image-taking position (see FIGS. 13 and 16C).

Figure 14:
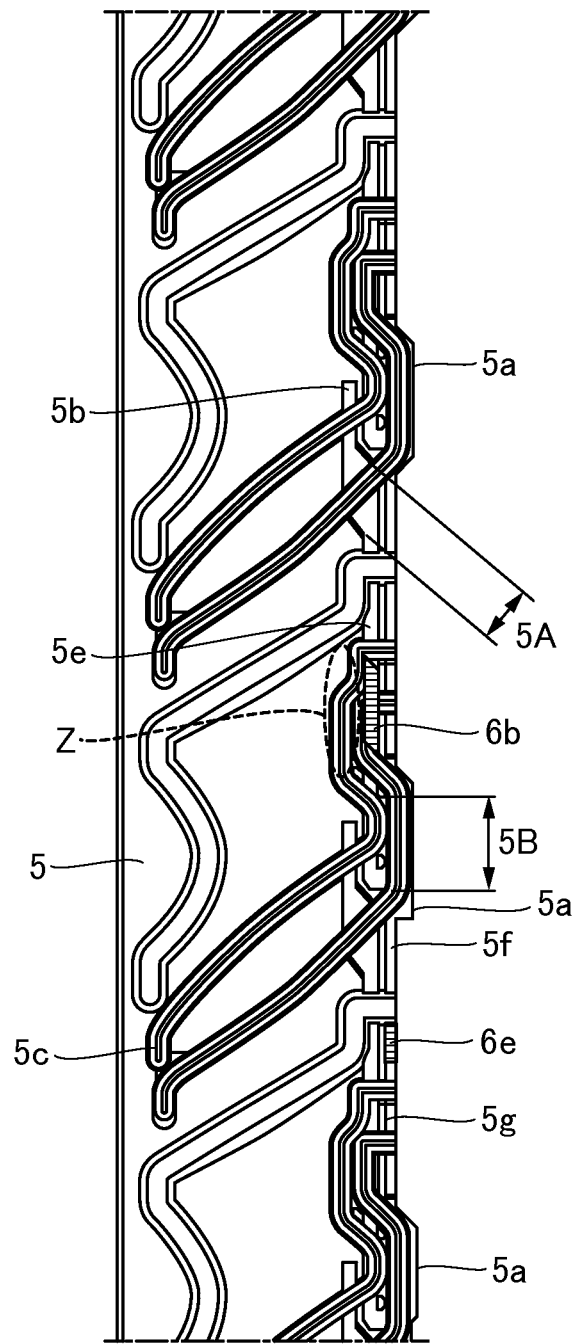
FIG. 14 is a developed view illustrating the inner circumference side of a cam cylinder in the second image-taking position.

Next, a description will be given of the relative position restriction between the cam cylinder and the linear cylinder in the optical axis direction in the second image-taking position (e.g., intermediate image-taking position between the WIDE image-taking position and the TELE image-taking position) after the cam cylinder 5 and the linear cylinder 6 are disposed relatively away from each other. In the second image-taking position of the lens barrel 19, the linear cylinder 6 is in the third relative position with respect to the cam cylinder 5 in the optical axis direction. FIG. 14 is a developed view illustrating the inner circumference side of a cam cylinder in the second image-taking position. FIG. 16B is a diagram illustrating the relative position restriction between the cam cylinder and the linear cylinder in the optical axis direction in the second image-taking position.

An object side wall 5*h* for the circumferential groove 5*e* of the cam cylinder 5 is eliminated in the second image-taking position of the lens barrel 19. Thus, the bayonet groove 6*g* which is formed by a region sandwiched between the first bayonet protrusion 6*b* and the second bayonet protrusion 6*e* of the linear cylinder 6 is mated with the circumferential rib portion 5*g* which is formed by the circumferential grooves 5*e* and 5*f* of the cam cylinder 5 (see FIGS. 14 and 16B). Specifically, a recess (the bayonet groove 6*g*) which is formed by the bayonet protrusion 6*b* and the bayonet protrusion 6*e* is received by a protrusion (the circumferential rib portion 5*g*) formed by the second bayonet groove (the circumferential groove 5*e*) and the third bayonet groove (the circumferential groove 5*f*). With this arrangement, the third relative position restriction between the cam cylinder 5 and the linear cylinder 6 in the optical axis direction is achieved in the second image-taking position.

Figure 15:
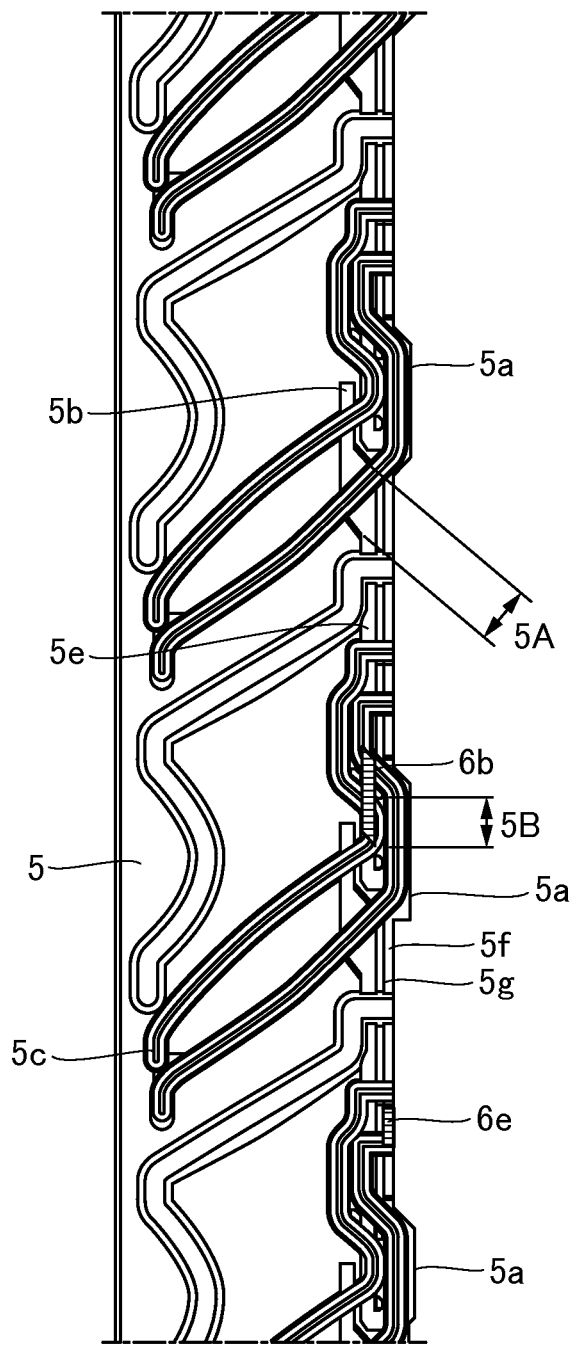
FIG. 15 is a developed view illustrating the inner circumference side of a cam cylinder in the third image-taking position.

Next, a description will be given of the relative position restriction between the cam cylinder and the linear cylinder in the optical axis direction in the third image-taking position (e.g., TELE image-taking position) after the cam cylinder 5 and the linear cylinder 6 are disposed relatively away from each other. FIG. 15 is a developed view illustrating the inner circumference side of a cam cylinder in the third image-taking position. As in the first image-taking state, the cam cylinder 5 is mated with the linear cylinder 6 in the third image-taking position (see FIG. 16C). In this manner, the mated state in the first image-taking position and the mated state in the second image-taking position are repeated.

In the lens barrel of the present embodiment, a plurality of bayonet protrusions is provided on the linear cylinder 6 at different positions in the optical axis direction and a plurality of bayonet grooves is provided on the cam cylinder 5 at different positions in the optical axis direction. The relative position restriction between the cam cylinder 5 and the linear cylinder 6 in the optical axis direction due to the engagement of the bayonet protrusions with the bayonet grooves is changed in accordance with the rotation of the cam cylinder 5 relative to the linear cylinder 6. The side wall surface on the object side can be opened at least by the circumferential groove 5e in the image-taking position of the lens barrel 19, and a cam groove or the like can be disposed on the region indicated by the symbol Z shown in FIG. 16B. Thus, the degree of freedom in selection of parts in which the cam groove 5c and the bayonet grooves 5b, 5e, 5f, 5A, and 5B are disposed on the inner circumference of the cam cylinder 5 can be increased, so that the lens barrel can correspond to various operations of lens groups.

In addition, in the lens barrel of the present embodiment, the second bayonet protrusion 6e is mated with the circumferential grooves 5e and 5f disposed on the inner circumference of the cam cylinder 5 instead of the fact that the projection 5a is mated with the linear rib 6a in the lens barrel disclosed in Japanese Patent Laid-Open No. 2011-215279. Thus, the degree of freedom in arrangement of the projection 5a is high as shown in FIG. 16B.

The configuration of the present invention is not limited to the above embodiments, but material, shape, dimension, configuration, number, arrangement position and the like of each of the components of the foregoing embodiments may be changed as appropriate without departing from the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-163025, filed on Aug. 6, 2013, which is hereby incorporated by reference herein in its entirety.

What is claimed is:

1. A lens barrel comprising;
   a lens holding unit configured to hold a lens;
   a cam cylinder that is provided with a cam groove for engaging with the lens holding unit on an inner circumference thereof and of which movement in the optical axis direction while being rotated causes the lens holding unit to move in the optical axis direction; and
   a linear cylinder that is disposed on the inner circumference side of the cam cylinder and restricts movement of the lens holding unit in the rotational direction while moving in the optical axis direction engaging with the cam cylinder,
   wherein a plurality of bayonet protrusions are provided on the linear cylinder at different positions in the optical axis direction, a plurality of bayonet grooves that engage with the bayonet protrusions provided on the linear cylinder so as to achieve a relative position restriction between the cam cylinder and the linear cylinder in the optical axis direction are further provided on the inner circumference of the cam cylinder at different positions in the optical axis direction, and the relative position restriction between the cam cylinder and the linear cylinder in the optical axis direction due to the engagement of the bayonet protrusions with the bayonet grooves is changed in accordance with a relative rotation of the cam cylinder with respect to the linear cylinder.

2. The lens barrel according to claim 1, wherein first and second bayonet protrusions are provided on the linear cylinder at different positions in the optical axis direction, and the first bayonet groove, the second bayonet groove, and the third bayonet groove which respectively engage with the first bayonet protrusion and the second bayonet protrusion are provided on the cam cylinder at different positions in the optical axis direction.

3. The lens barrel according to claim 2, wherein, in a first relative position of the linear cylinder with respect to the cam cylinder in the optical axis direction, the first bayonet protrusion contacts against both side wall surfaces of the first bayonet groove in the width direction so that a first relative position restriction between the cam cylinder and the linear cylinder in the optical axis direction is achieved, whereas in a second relative position of the linear cylinder with respect to the cam cylinder in the optical axis direction, the first bayonet protrusion contacts against one side wall surface of the second bayonet groove in the width direction and a recess formed by the first bayonet protrusion and the second bayonet protrusion receives a protrusion formed by the second bayonet groove and the third bayonet groove, so that a second relative position restriction between the cam cylinder and the linear cylinder in the optical axis direction is achieved.

4. The lens barrel according to claim 2, wherein, in a third relative position of the linear cylinder with respect to the cam cylinder in the optical axis direction, a recess formed by the first bayonet protrusion and the second bayonet protrusion receives a protrusion formed by the second bayonet groove and the third bayonet groove, so that a third relative position restriction between the cam cylinder and the linear cylinder in the optical axis direction is achieved.

5. An imaging apparatus comprising:
   the lens barrel according to claim 1.

* * * * *